(12) United States Patent
Torrey et al.

(10) Patent No.: US 6,466,799 B1
(45) Date of Patent: Oct. 15, 2002

(54) PREMISES TELEPHONIC INTERFACE SYSTEM FOR COMMUNICATING USING A HAND-HELD WIRELESS DEVICE

(75) Inventors: Jason Patrick Torrey, Overland Park, KS (US); Ken E. Ward, Independence, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/302,870

(22) Filed: Apr. 30, 1999

(51) Int. Cl.[7] .................................................. H04Q 7/20
(52) U.S. Cl. ...................... 455/462; 455/74.1; 455/552; 455/465
(58) Field of Search ................................. 455/557, 554, 455/11.1, 555, 462, 15, 422, 426, 74.1, 552, 553, 465; 379/210, 211, 399

(56) References Cited

U.S. PATENT DOCUMENTS 4,775,997 A * 10/1988 West et al. .................. 455/554

(List continued on next page.)

OTHER PUBLICATIONS

QUALCOMM Incorporated, "QUALCOMM CDMA Fixed Wireless Phones", http://www.qualcom.com (Mar. 19, 1999).

QUALCOMM Incorporated, "QCT 6000 CDMA Digital Cellular Fixed Wireless Terminal", QUALCOMM Incorporated (Sep., 1997).

Sony Electronics, Inc., "D–WAVE ASTRA Digital Phones Accessories", http://www.sel.sony.com (Mar. 19, 1999).

*Primary Examiner*—Dwayne Bost
*Assistant Examiner*—Sonny Trinh
(74) *Attorney, Agent, or Firm*—Harley R. Ball; Steven J. Funk; Kevin D. Robb

(57) ABSTRACT

According to the invention, a method and apparatus are disclosed for allowing a consumer to place wireless calls over their hand-held wireless communications device from telephones connected through-out their location, while keeping the convenience and flexibility of a hand-held communications device. More specifically, the present invention includes a communications premises station system for receiving a hand-held wireless communications device which communicates with a wireless network and has a premises station interface. The communications premises station system has one or more telephonic interfaces for communicating with one or more telephonic devices (e.g., telephones, facsimile machines, computers). When the hand-held wireless communications device is placed in premises station (similar to a battery charger cradle), the hand-held wireless communications device electrically connects to communications premises station system. A call processing element of the communications premises station system exchanges signaling information with the hand-held wireless communications device, and converts incoming signals from the hand-held wireless communications device to incoming signals to the telephonic device, and converts outgoing signals from the telephonic device to outgoing signals to the hand-held wireless communications device. In this manner, when the hand-held wireless communications device is placed in the premises station, wireless telephonic calls can be placed from and received by a telephonic device connected to the communications premises station system.

16 Claims, 8 Drawing Sheets

U.S. PATENT DOCUMENTS

| | | | |
|---|---|---|---|
| 4,972,457 A | * 11/1990 | O'Sullivan | 455/418 |
| 5,309,502 A | 5/1994 | Hirai | |
| 5,367,558 A | 11/1994 | Gillig et al. | |
| 5,442,680 A | 8/1995 | Schellinger et al. | |
| 5,533,099 A | 7/1996 | Byrne | |
| 5,544,227 A | * 8/1996 | Blust et al. | 455/426 |
| 5,550,895 A | 8/1996 | Burson et al. | |
| 5,594,782 A | 1/1997 | Zicker et al. | |
| 5,673,308 A | 9/1997 | Akhavan | |
| 5,675,629 A | 10/1997 | Raffel et al. | |
| 5,745,851 A | 4/1998 | Goto | |
| 5,774,805 A | 6/1998 | Zicker | |
| 5,787,354 A | 7/1998 | Gray et al. | |
| 5,812,637 A | * 9/1998 | Schornack et al. | 455/422 |
| 5,903,835 A | * 5/1999 | Dent | 370/280 |
| 5,991,640 A | * 11/1999 | Lilja et al. | 455/557 |
| 6,073,031 A | * 6/2000 | Helstab et al. | 455/557 |
| 6,366,784 B1 | * 4/2002 | Hsueh | 455/462 |

\* cited by examiner

PREMISES TELEPHONIC INTERFACE SYSTEM FOR COMMUNICATING USING A HAND-HELD WIRELESS DEVICE

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

This invention relates to telecommunications and hand-held wireless devices; and more particularly, to a premises telephonic interface system allowing a telephonic device to communicate over a hand-held wireless device.

2. Description of the Prior Art

Consumers are increasingly using cellular and other wireless technology to make and receive telephone calls. The deployment of more cellular networks and the technological advances in cellular phone technology have resulted in more consumers using hand-held wireless communications devices. Many consumers have become reliant of these hand-held wireless devices for their communications needs.

Moreover, many cellular service carriers offer economically advantageous cellular packages where a consumer pays on a monthly basis for a certain quantity of airtime minutes. Typically, the more minutes purchased, the less the average minute charge. Additionally, many cellular carriers do not charge customers an additional fee for long distance calls placed using their cellular service. In many instances, a consumer may save money by placing long distance calls over their cellular phone, rather than pay for long distance charges incurred by making a call using their residential wire-based local phone service provider. Therefore, consumers will in many instances desire to use their wireless phone at home.

However, depending on the wireless service, the wireless reception might only work in a portion of a consumers house (i.e., upstairs—not in the downstairs or basement). This becomes problematic when receiving cellular calls at home as a consumer might miss a call because the consumer is in a part of the location which does not get adequate reception, or the consumer might leave the phone in a suitable location (e.g., upstairs) and have to rush to the phones location when it rings. In many situations, consumers already have telephones connected throughout their location (e.g., residence, business). Consumers therefore desire a mechanism to allow them to access their cellular phone using any telephone at their location, while maintaining the convenience and mobility of the hand-held communications device.

Certain wireless equipment providers offer cellular fixed wireless terminals. These wireless terminals allow the connection of telephonic devices from which wireless calls can be placed and received. Furthermore, a wireless terminal can activate all phone jacks at a single location for placing and receiving wireless calls using the same phone number when the wireless terminal is connected to a standard phone jack. These wireless terminals operate via A.C. power or battery. Although some carriers allow the same cellular phone number or calling plan to be used by two different cellular communications devices, many do not and typically consumers are required to pay a surcharge for such convenience. Moreover, these wireless terminals do not provide hand-held convenience or mobility, nor do they additionally interface a telephone network to allow a consumer to select which network to use to place the call, nor allow calls to be simultaneously placed over the wireless and telephone networks.

SUMMARY OF THE INVENTION

According to the invention, a method and apparatus are disclosed for allowing a consumer to place wireless calls over their hand-held wireless communications device from telephones connected through-out their location, while keeping the convenience and flexibility of a hand-held communications device. Additionally, the present invention allows simultaneous calls to be placed over wireless and telephone network using different connected standard telephonic devices. Furthermore, connected telephonic devices can select which network to place a call, which provides additional convenience and personal security, especially in an emergency situation when only one of the networks is accessible.

More specifically, the present invention includes a communications premises station system for receiving a hand-held wireless communications device which communicates with a wireless network and has a premises station interface. The communications premises station system has one or more telephonic interfaces for communicating with one or more telephonic devices (e.g., telephones, facsimile machines, computers).

When the hand-held wireless communications device is placed in premises station (similar to a battery charger cradle), the hand-held wireless communications device electrically connects to communications premises station system. The premises station can either be a physically separate unit or incorporated into the communications premises station system. A call processing element of the communications premises station system exchanges signaling information with the hand-held wireless communications device, and converts incoming signals from the hand-held wireless communications device to incoming signals to the telephonic device, and converts outgoing signals from the telephonic device to outgoing signals to the hand-held wireless communications device. In this manner, when the hand-held wireless communications device is placed in the premises station, wireless telephonic calls can be placed from and received by a telephonic device connected to the communications premises station system.

The wireless network is typically a cellular network; however the present invention is not so limited. Rather, the present invention allows this to be based on a consumer choice of which wireless provider and communications device to use. The communications premises station system also provides D.C. power, indications of on-hook and off-hook conditions, ring current, ring-back tones and busy tones to the connected telephonic devices.

Moreover, the present invention also allows the communications premises station system to be connected to a standard telephone network so that connected telephonic devices can communicate both over the wireless and the telephone networks. Additionally, an embodiment of the present invention includes a switching mechanism which allows for a single connected telephonic device to selectively switch between the wireless and telephone networks.

Moreover, when two or more telephonic devices are connected to the communications premises station system, simultaneous calls can be placed over the wireless and telephone networks.

BRIEF DESCRIPTION OF THE DRAWINGS

The appended claims set forth the features of the present invention with particularity. The invention, together with its advantages, may be best understood from the following detailed description taken in conjunction with the accompanying drawings of which:

DETAILED DESCRIPTION OF THE PREFERRED EMBODIMENT

FIGS. 1A, 1B, 2A, and 2B and their discussion herein are intended to provide a description of a general operating environment in which the present invention can be practiced. The present invention is not limited to a single operating environment. Moreover, the architecture and functionality of the present invention as taught herein and would be understood by one skilled in the art is extensible to an unlimited number of operating environments and embodiments in keeping with the scope and spirit of the present invention.

Figure 1A:
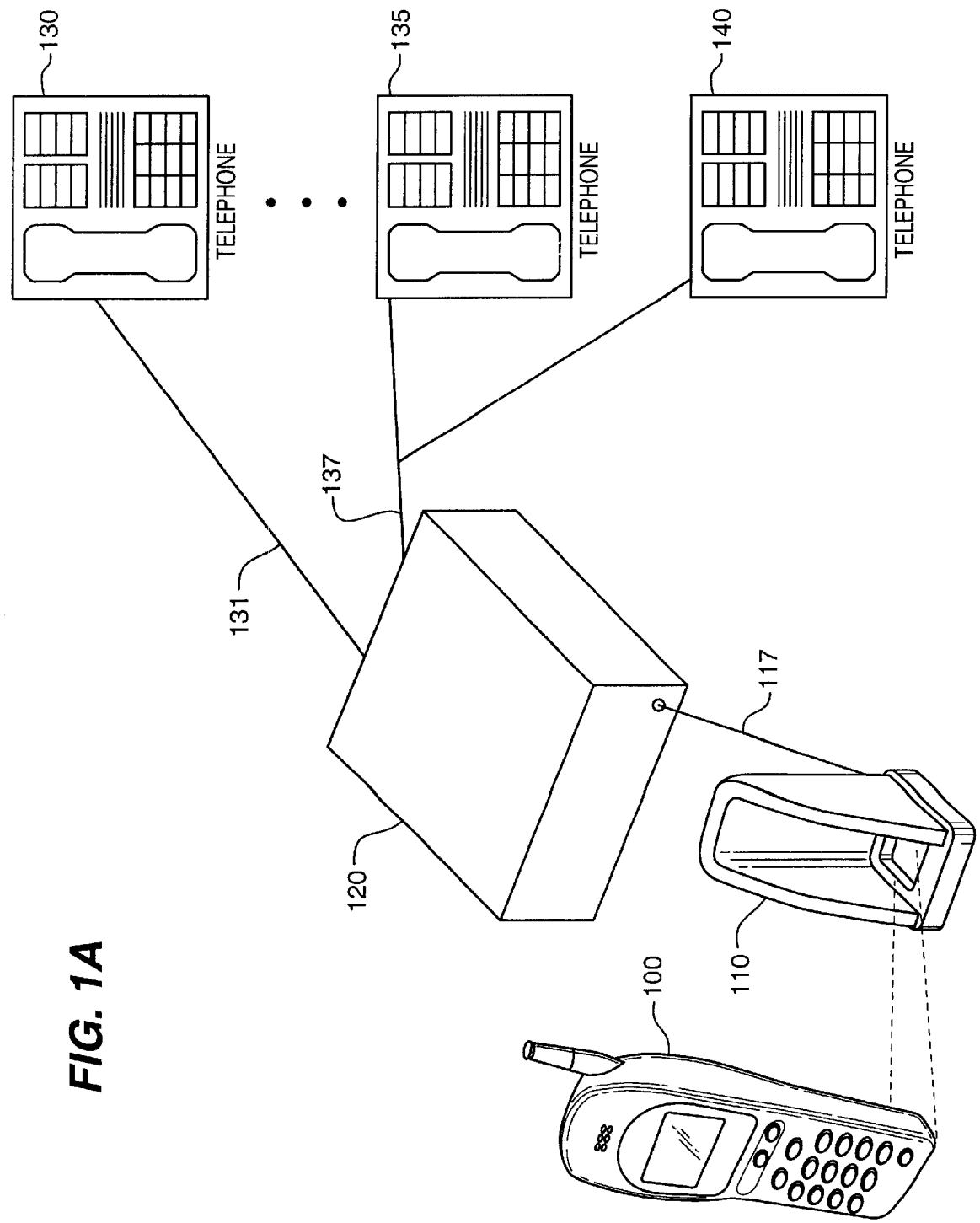
FIGS. 1A, 1B, 2A and 2B are block diagrams of an exemplary network environment in which the present invention may be practiced.

Turning first to FIG. 1A, an exemplary operating environment is illustrated in which the present invention may be practiced. As shown, the present invention comprises a premises station 110 connected by link 117 to a premises converter 120. In embodiments, premises station 110 and premises converter 120 are incorporated into a single physical unit. A plurality of telephonic devices 130, 135, 140 are connected to a premises converter 120 via standard telephone cords 131, 137. Premises station 110 provides an electrical interface to a hand-held wireless communication device 100 for communicating signaling information and user calls, as well as providing power for operating and charging the battery of hand-held wireless communication device 100.

Figure 1B:
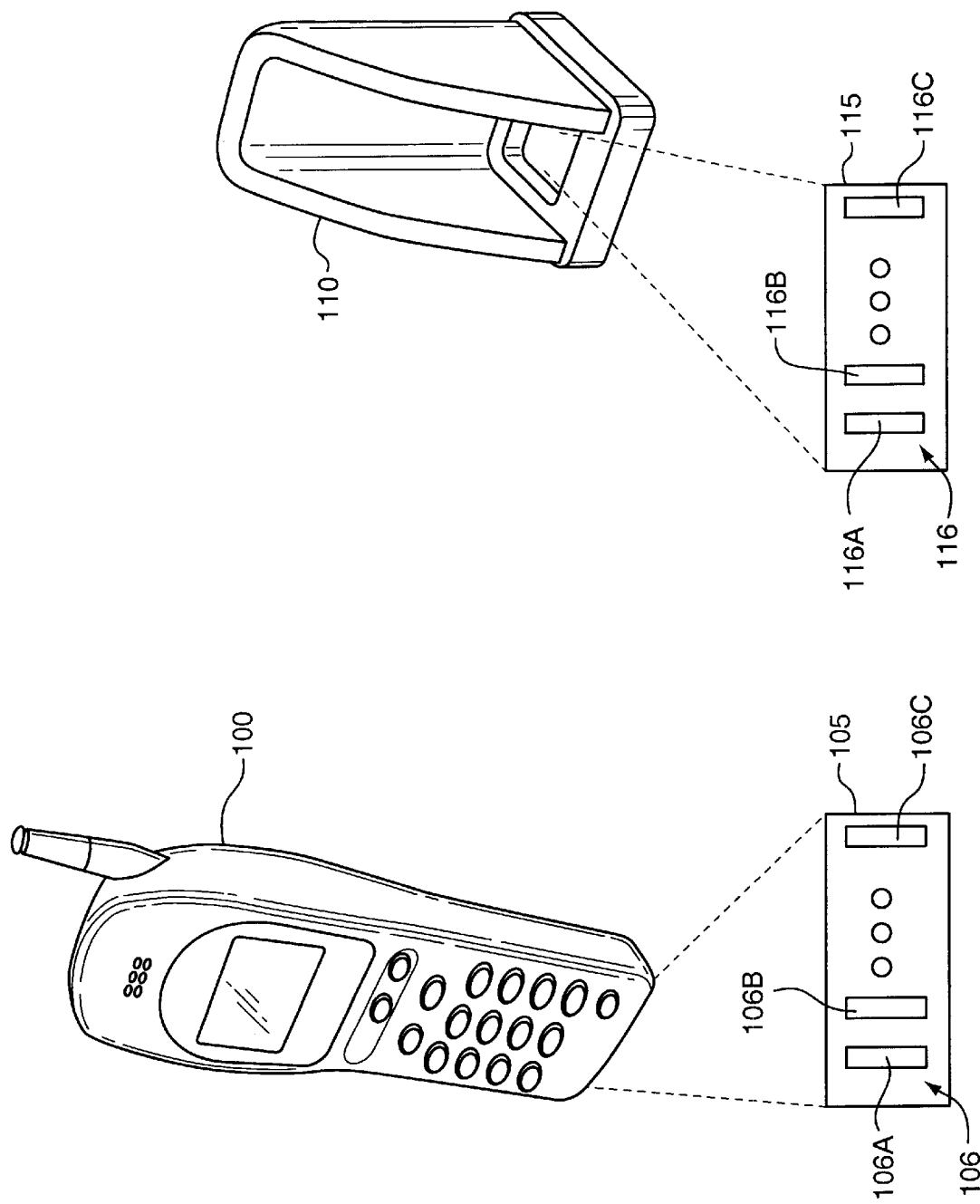

An embodiment of the interface between hand-held wireless communication device 100 and premises station 110 is better illustrated in FIG. 1B. The bottom 105 of hand-held wireless communication device 100 contains a plurality of communications and power connectors 106 which come in contact with matching connectors 116 on the surface 115 of premises station 110. In an embodiment, connector 106A mates with connector 116A to provide a signaling communications path between the hand-held wireless communication device 100 and premises converter 120 for exchanging call signaling information (e.g., incoming call, place outgoing call, end call, and other remote operation functionality provided by the hand-held wireless communication device 100); connector 106B mates with connector 116B to provide a call communications path between the hand-held wireless communication device 100 and premises converter 120 for exchanging call signals representing the telephonic call; and connector 106C mates with connector 116C to provide D.C. power from the premises station 110 to the hand-held wireless communication device 100.

When hand-held wireless communications device 100 resides in premises station 110, telephone calls may be placed and received by telephones 130, 135, 140 over a wireless network. In addition, facsimile machines and data communications equipment (e.g., computers) could be connected to premises converter 120 for placing and receiving telephonic calls (e.g., telephone, facsimile and data calls).

Figure 2A:
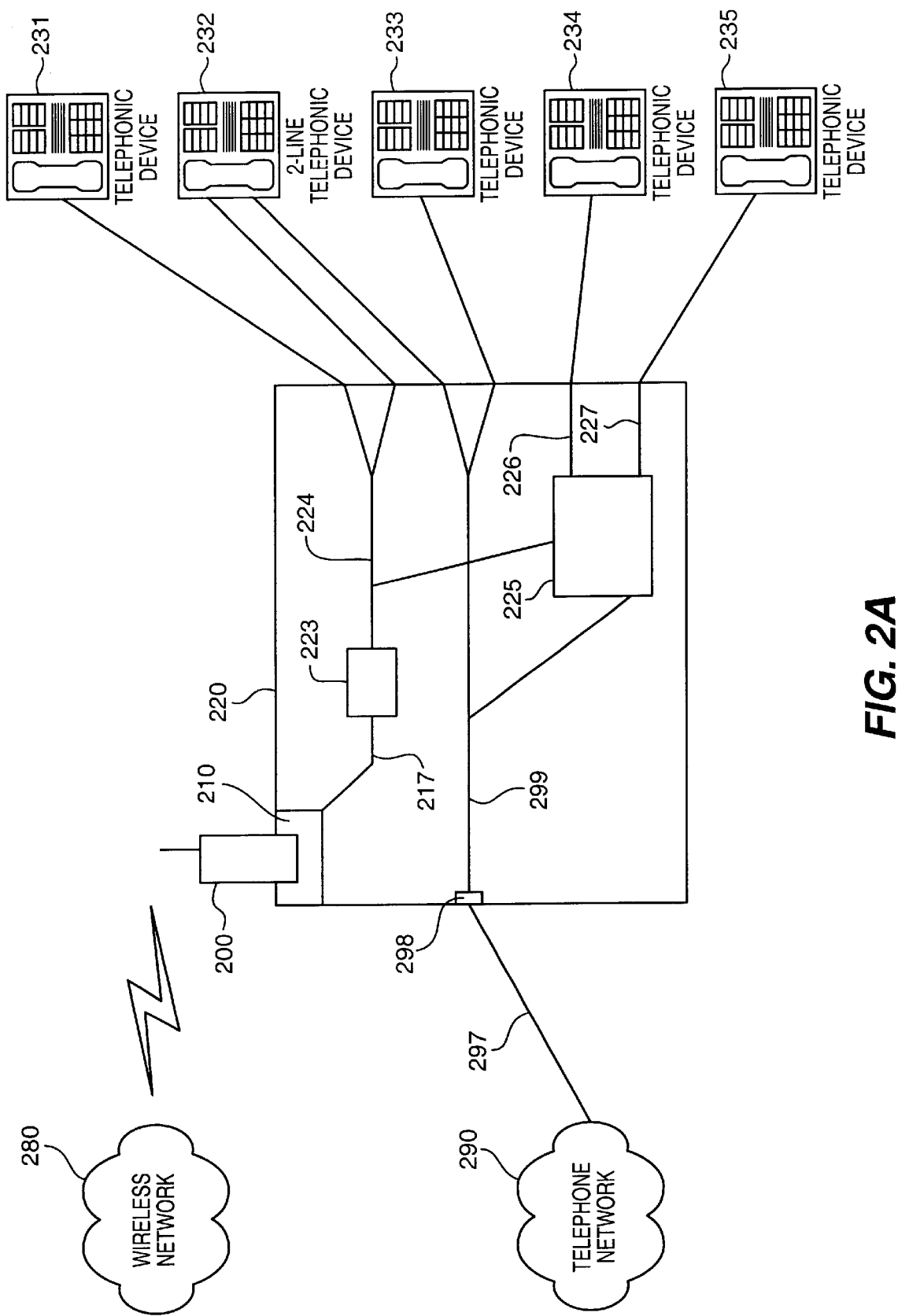

Turning now to FIG. 2A, shown is a block diagram of a second exemplary operating environment in which the present invention may be practiced. In this configuration, a plurality of telephonic devices (e.g., telephones, facsimile machines, computers) are electrically connected to premises converter 220 for placing and receiving simultaneous or non-simultaneous telephonic calls over wireless network 280 and telephone network 290.

Wireless telephonic calls can be made when hand-held wireless communications device 200 is located in premises station 210, which can either be a separate unit, or incorporated into premises converter 220 as shown in FIG. 2A. Call processor 223, connected to premises station 210 via link 217, exchanges call signaling messages with the hand-held wireless communications device 200, converts incoming signals from the hand-held wireless communications device to incoming signals compatible with the first telephonic device; and converts outgoing signals from the first telephonic device to outgoing signals compatible with the hand-held wireless communications device.

Figure 2B:
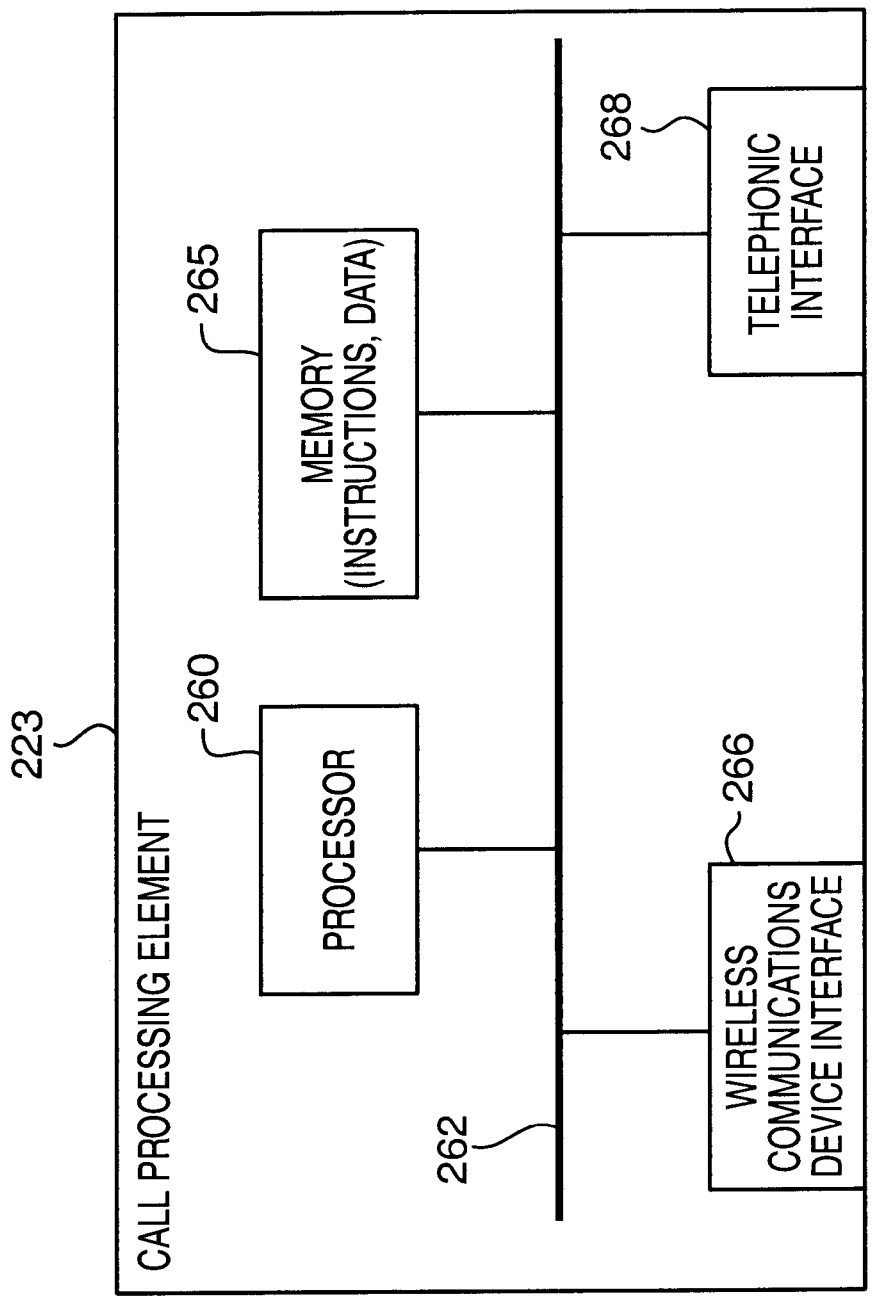

An embodiment of call processor 223 is shown in FIG. 2B, in which call processor 223 comprises a processor 260, memory 265, a wireless communications device interface 266, and a telephonic interface 268, which are electrically coupled via bus 262. Memory 265 is one type of computer-readable medium, and typically comprises random access memory (RAM), read only memory (ROM), integrated circuits, and/or other memory components. Memory 265 typically stores computer-executable instructions to be executed by processor 260 and/or data which is manipulated by processor 260. Telephonic interface 268 communicates with telephonic devices 231, 232, 234, 235 over link 224. Additionally, telephonic interface 268 supplies telephonic devices 231–235 with D.C. power, indications of on-hook and off-hook conditions, ring current, ring-back tones and busy tones. As would be readily apparent to one skilled in the art, numerous other embodiments for call processor 223 are possible in keeping with the scope and spirit of the invention.

Returning to FIG. 2A, premises converter 220 contains at least one telephone network-interface 298 for connecting to telephone network 290 over line 297. In an embodiment, line 297 is a standard phone cord which connects to telephone network 290 via a standard residential wall phone socket, and carries a standard analog phone signal. In other embodiments, telephone network interface 298 can be more sophisticated for multiplexing a plurality of telephone calls over line 297 or digitally interfacing telephone network 290.

Premises converter 220 also optionally comprises a switching element 225 for allowing the premise converter switch a connected telephonic device 234, 235 between the wireless network 280 and telephone network 290. As shown in FIG. 2A, switching element 225 has two ports 226, 227 for connecting to telephonic devices 234, 235. Switching element 225 typically comprises a non-blocking cross-connect functionality. This switching capability allows the premises converter to provide enhanced features such as connecting telephonic device 234 to one of the wireless and telephone networks 280, 290, while simultaneously connecting telephonic device 235 to the other network 280, 290; providing 3-way calling by bridging both telephonic devices 234, 235 to a call placed or received over the wireless or telephone network 280, 290; and providing ringing current to telephonic devices 234, 235. Additionally, switching element 225 comprises control circuitry which allows telephonic devices 234, 235 to select which of the wireless or telephone networks 280, 290 to connect (e.g., telephonic device 234, 235 generates tones "*w" connects to wireless network 280, and tones "*t" connect to telephone network 290; or via a line selection button on telephonic device 234, 235).

The embodiment of the present invention as illustrated in FIG. 2A provides significant flexibility for the consumer. For example, telephonic device 231 can only place calls over the wireless network 280; telephonic device 233 can only place calls over the telephone network 290; and 2-line telephonic device 232 allows the consumer to use the capabilities of the two line phone to select between the wireless network 280 and telephone network 290. As discussed supra, telephonic devices 234, 235 are connected to switching element 225 which provides additional network selectability. Moreover, this embodiment according to the present invention allows simultaneous calls to be placed over the wireless and telephone networks 280, 290, with one or more telephonic devices 231–235 to connect to these wireless and telephone network calls.

Hand-held wireless device 200 supports remote operation by call processor 223 through the exchange of signaling information. This exchanging of signaling information, inter alia, allows call processor 223 to direct hand-held wireless device 200 to place a call to a specified number or to answer an incoming call; and allows hand-held wireless device 200 to inform call processor 223 of an incoming call (e.g., a ring indication signal) and to verify the occurrence of any request operation or receipt of a signaling message. Additionally, hand-held wireless device 200 exchanges telephonic signals with call processor 223 which represent the actual telephonic call. The signaling information could be in-band (i.e., sent over the same communications path) or out-of-band (i.e., using a separate signaling communications path). The operation and the exchange-of signaling information is further described in relation to FIGS. 3A–3B.

Figure 3A:
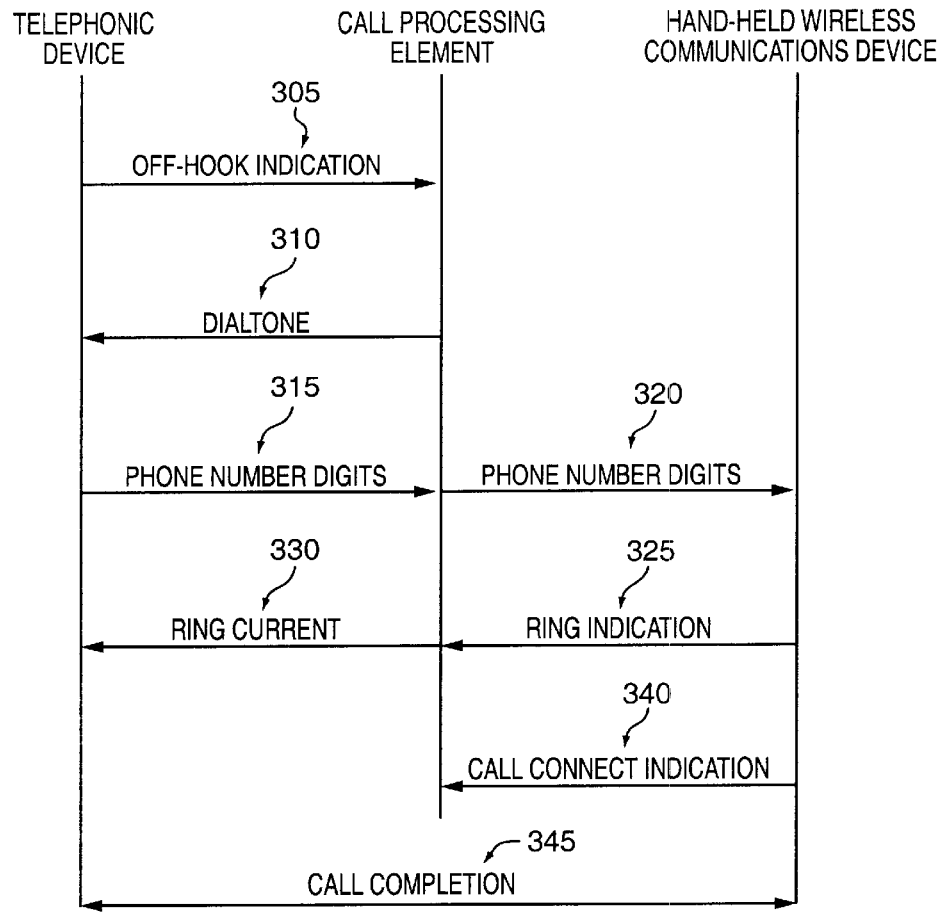
FIGS. 3A–3B are message sequence charts illustrating the flow of messages among a telephonic device, call processor and hand-held wireless communication device in an embodiment of the present invention.

FIG. 3A is a message sequence chart that depicts the operation of the invention for initiating and completing a wireless call from a telephonic device. Message sequence charts are a well-known format for depicting communication between elements. When a telephonic device goes off-hook, an off-hook indication 305 is received by the call processing element, which generates a dialtone signal for the telephonic device. Call processing element then collects phone number digits (315) from the telephonic device, and relays them to the hand-held wireless communications device (320). Hand-held communications device then places the wireless call and sends a ring indication signal 325 to the call processing element, which then provides ring current 330 to the telephonic device. Once the wireless call is established, the hand-held wireless device communicates a call connect indication 340 to the call processing element, which then connects the telephonic device to the hand-held wireless communications device as indicated by call completion 345.

Figure 3B:
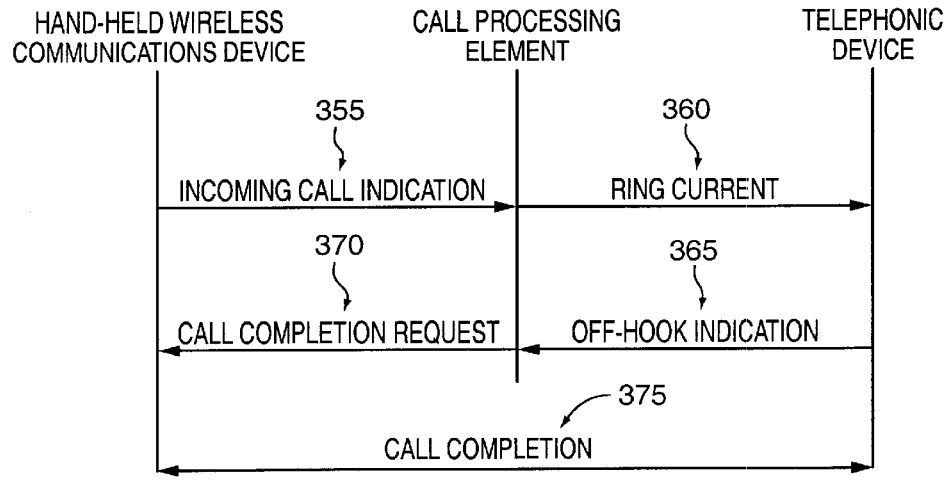

FIG. 3B is a message sequence chart that depicts the operation of the invention for completing a wireless call from the hand-held communications device to a telephonic device. When the hand-held wireless communications device receives a request from the cellular network to complete an incoming call, the call processing element receives an incoming call indication 355 from the hand-held communications device, and provides ring current 360 to the telephonic device. Call processing element recognizes when the telephonic device goes off-hook (represented by off-hook indication 365), and communicates a call completion request 370 to the hand-held communications device, which accepts the call from the wireless network. The wireless call is then established, and the call processing element connects the telephonic device to the hand-held wireless communications device as indicated by call completion 375.

Figure 4A:
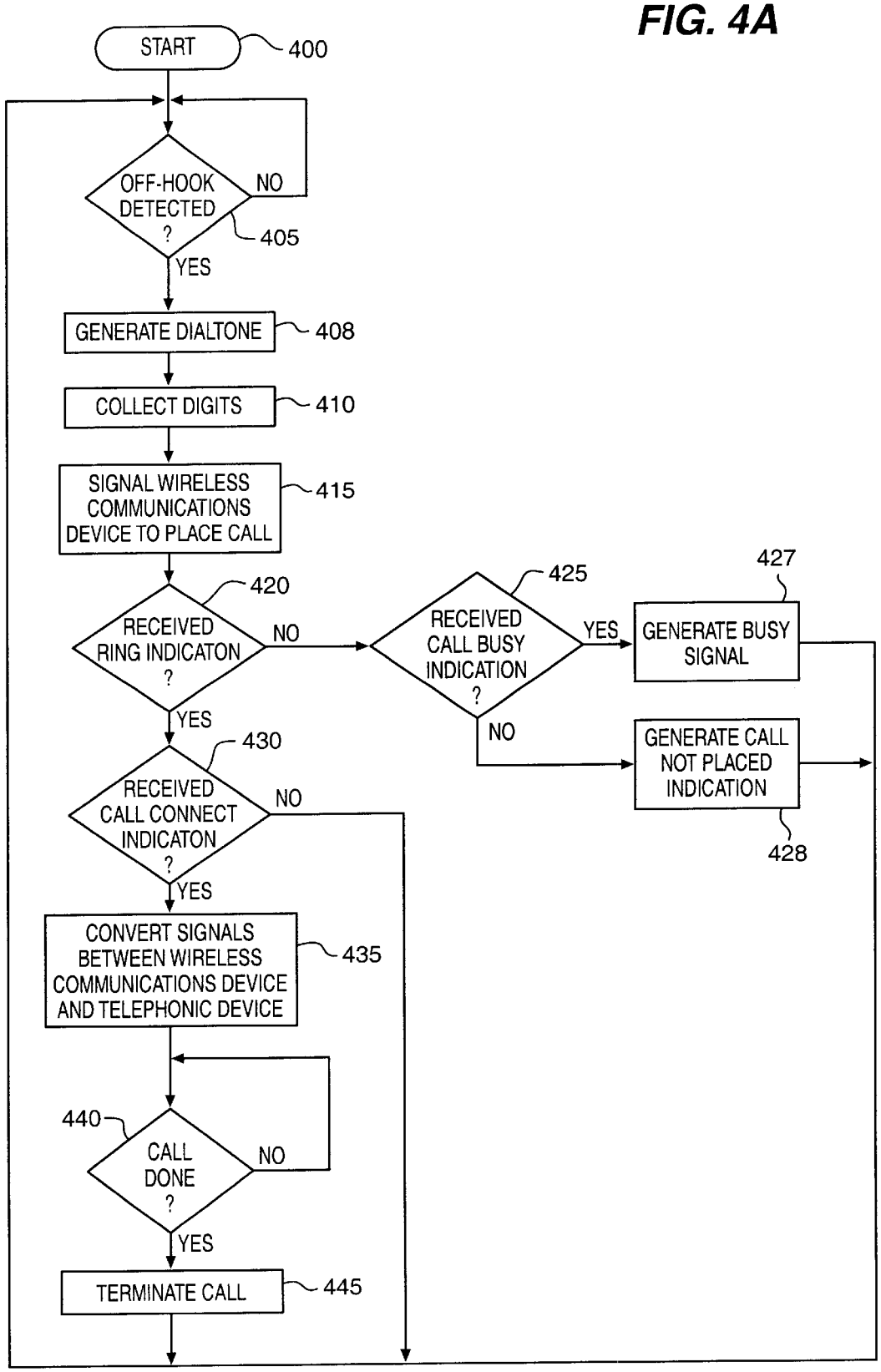
FIGS. 4A–4B are is a flow diagrams illustrating the steps performed by a call processor in an embodiment of the present invention.

Turning now to FIG. 4A, illustrated are the steps performed by call processor 223 (FIG. 2A) for initiating a call over the wireless network in an embodiment of the present invention. Processing begins with step 400, and then proceeds to step 405 where the call processor loops until it detects an off-hook condition of a telephonic device. Then, dialtone is generated (step 408), the telephone digits are collected (step 410), and the wireless communications device is signaled to place a call using the collected digits (step 415). Then, in step 420, if a ring indication is received from the wireless communications device, then, if a call connect request indication is received in step 430 (i.e., the cellular call was completed), then the call is connected between the hand-held wireless communications device and the telephonic device in step 435 and the call processor converts communications signals as required. When the call is completed as determined in step 440, the call is terminated as represented by step 445. Otherwise, if a ring indication is not received in step 420, then if a busy indication has been received as determined in step 425, a busy signal tone is generated in step 427; otherwise, a call not placed indication signal is generated in step 428.

Figure 4B:
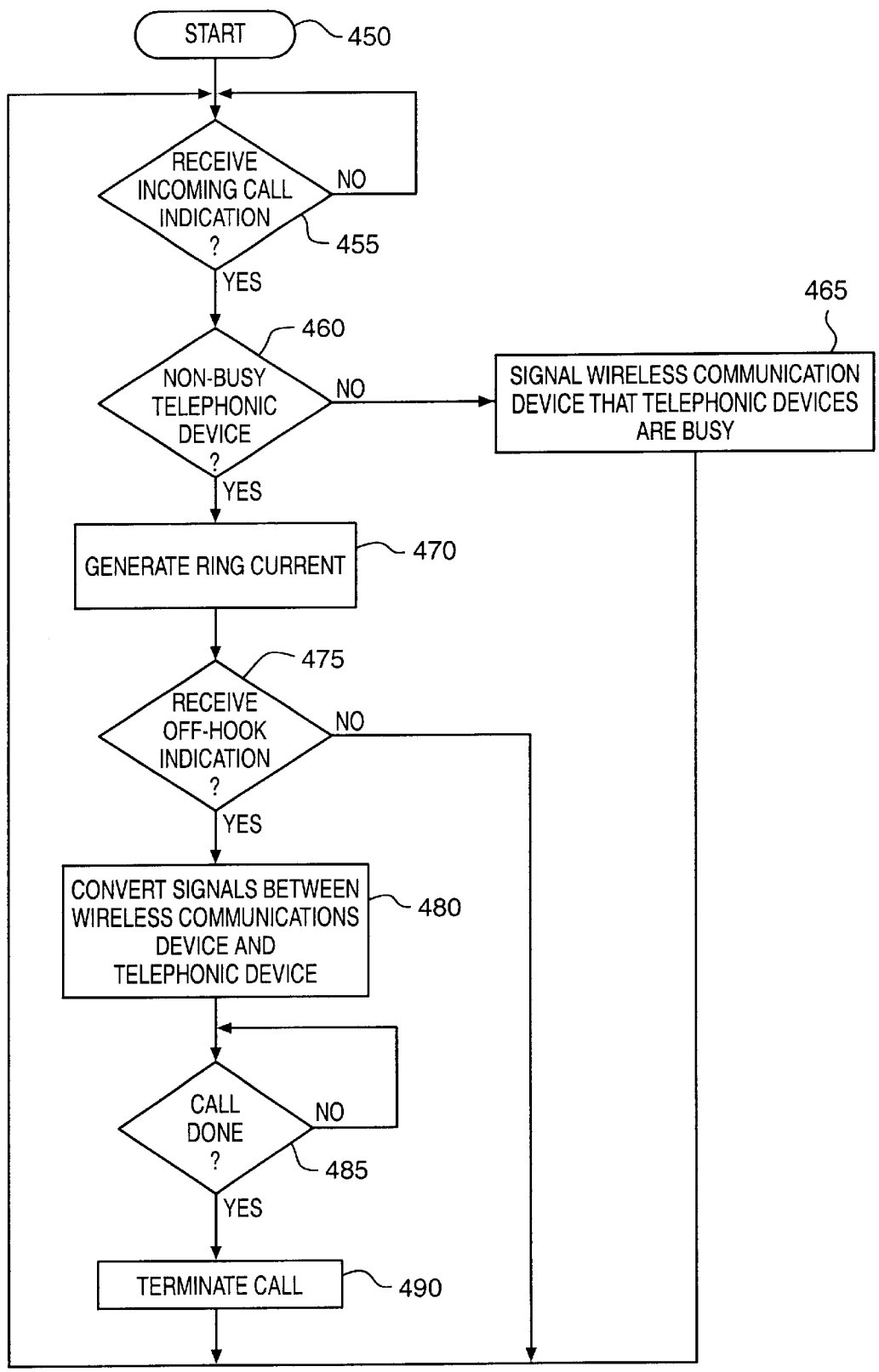

Turning now to FIG. 4B, illustrated are the steps performed by call processor 223 (FIG. 2A) for connecting a call from the hand-held wireless communications device to a telephonic device. Processing begins with step 450, and then proceeds to step 455 where the call processor loops until it receives an incoming call indication from the hand-held wireless communications device. Then, if the telephonic devices are busy as determined in step 460, the a busy signal indication is returned to the hand-held wireless communications device in step 465. Otherwise, ring current is generated in step 470. If a telephonic device goes off-hook as determined in step 475, then the call is connected between the hand-held wireless communications device and the telephonic device in step 480 and the call processor converts communications signals as required. When the call is completed as determined in step 485, the call is terminated as represented by step 490.

Figure 5:
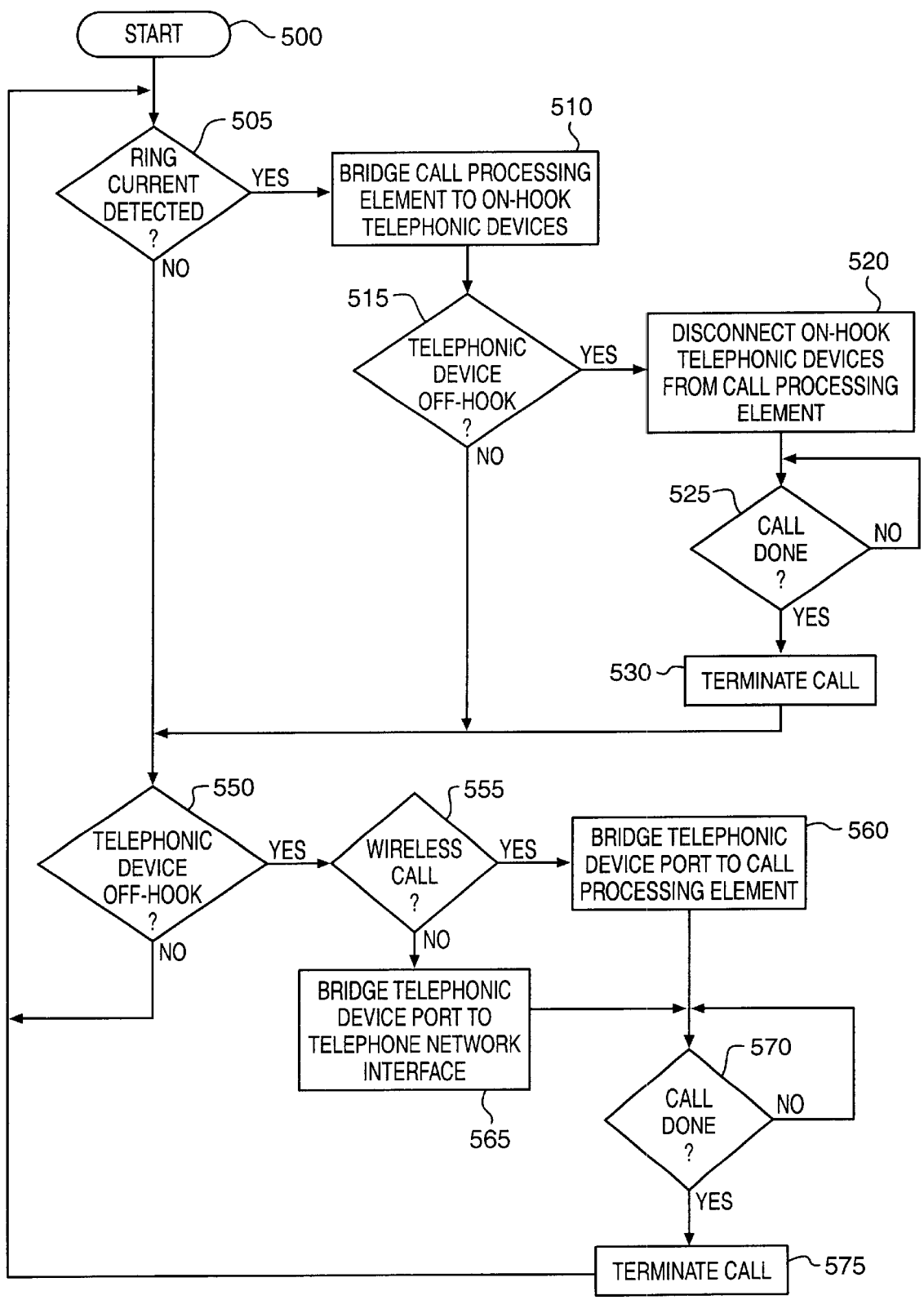
FIG. 5 is a flow diagram illustrating the steps performed by a switching mechanism in an embodiment of the present invention.

Turning now to FIG. 5, illustrated are the steps performed by the switching element 225 (FIG. 2A) in an embodiment of the present invention. Processing begins with step 500. If ring current is detected in step 505, then the switch element, in step 510, bridges the call processing element to the on-hook telephonic devices connected to the switching element ports 226, 227. Then, if an attached on-hook telephonic device goes off-hook as determined in step 515, the switching element disconnects the other on-hook telephonic devices from the call processing element in step 520, and then loops in step 525 until the call is completed. The call is then terminated in step 530 by disconnecting the bridged telephonic device from the call processor.

The switching matrix also monitors its ports 226, 227 for the condition of a connected telephonic device going off-hook as determined in step 550. If such an off-hook condition is detected, then, if it is a wireless call request as determined in step 555, then the telephonic device is bridged to the call processing element in step 560; otherwise the telephonic device is bridged to the telephone network connection 299 in step 565. The switching element monitors the call, and when completed as determined in step 570, the call is terminated in step 575.

In view of the many possible embodiments to which the principles of our invention may be applied, it will be appreciated that the embodiment described herein with respect to the drawing figures is only illustrative and should not be taken as limiting the scope of the invention. To the contrary, the invention as described herein contemplates all such embodiments as may come within the scope of the following claims and equivalents thereof.

We claim:

1. A Communications premises station system for receiving a hand-held wireless communications device which communicates with a wireless network and has a premises station interface, the communications premises station system comprising:

a network interface configured to communicate with a telephone network;

a hand-held wireless communications device interface configured to connect with the premises station interface of the hand-held wireless communications device to communicate with the wireless network;

a first port for connecting to a first telephonic device;

a second port for connecting to a second telephonic device;

a switching system connected to the network interface, the hand-held wireless communications device interface, the first port, and the second port and configured to connect the first telephonic device to one of the network interface or the hand-held wireless communications device interface and connect the second telephonic device to another one of the network interface or the hand-held wireless communications device interface to allow the first telephonic device and the second telephonic device to place calls simultaneously; and a call processing element electrically coupled to the hand-held wireless communications device interface, for converting incoming signals from the hand-held wireless communications device to incoming signals to the first or second telephonic device, and for converting outgoing signals from the first or second telephonic device to outgoing signals to the hand-held wireless communications device.

2. The communications premises station system of claim 1, wherein the hand-held wireless communications device comprises a cellular telephone.

3. The communications premises station system of claim 1, wherein the first telephonic device comprises a telephone.

4. The communications premises station system of claim 1, wherein the first telephonic device comprises a facsimile machine.

5. The communications premises station system of claim 1, wherein the first telephonic device comprises a computer.

6. The communications premises station system of claim 1, wherein the first port provides D.C. power.

7. The communications premises station system of claim 1, wherein the first port provides an indication of an on-hook condition.

8. The communications premises station system of claim 1, wherein the first port provides an indication of an off-hook condition.

9. The communications premises station system of claim 1, wherein the first port provides ring current.

10. The communications premises station system of claim 1, wherein the first port provides ring-back tones.

11. The communications premises station system of claim 1, wherein the first port provides busy tones.

12. The communications premises station system of claim 1, wherein the switching system includes control logic for receiving a selection command from the first telephonic device and for connecting the first telephonic device to the wireless or telephone network based on the received selection command.

13. The communications premises station system of claim 1, wherein the switching system simultaneously allows the first telephonic device to communicate over the wireless network and the second telephonic device to communicate over the telephone network.

14. A method for operating a communications premises station system for providing simultaneous telephone calls by an attached first telephonic device and by an attached second telephonic device over a telephone network or Over a wireless network via a connected hand-held wireless communications device, the method comprising the steps of:

communicating with the first telephonic device through a first port;

communicating with the second telephonic device through a second port;

connecting the first telephonic device to one of the telephone network or the wireless network;

connecting the second telephonic device to another one of the telephone network or the wireless network to allow the first telephonic device and the second telephonic device to place calls simultaneously;

converting incoming signals from the hand-held wireless communications device to incoming signals to the first or second telephonic device, and for converting outgoing signals from the first or second telephonic device to outgoing signals to the hand-held wireless communications device.

15. The method of claim 14, further including controlling a switching system to connect the first telephonic device to the wireless network.

16. The method of claim 14, further including controlling a switching system to connect the second telephonic device to the telephone network.

* * * * *